United States Patent
Malladi

(10) Patent No.: US 12,045,375 B2
(45) Date of Patent: Jul. 23, 2024

(54) TECHNIQUES OF TRACKING SOFTWARE USAGE ON A REMOTE DEVICE

(71) Applicant: Analog Devices, Inc., Wilmington, MA (US)

(72) Inventor: Shankar S. Malladi, Walpole, MA (US)

(73) Assignee: Analog Devices, Inc., Wilmington, MA (US)

(*) Notice: Subject to any disclaimer, the term of this patent is extended or adjusted under 35 U.S.C. 154(b) by 4 days.

(21) Appl. No.: 17/409,446

(22) Filed: Aug. 23, 2021

(65) Prior Publication Data

US 2022/0058279 A1 Feb. 24, 2022

Related U.S. Application Data

(60) Provisional application No. 63/069,671, filed on Aug. 24, 2020.

(51) Int. Cl.
*G06F 21/62* (2013.01)
*G06F 21/10* (2013.01)
*H04L 67/50* (2022.01)

(52) U.S. Cl.
CPC .......... *G06F 21/629* (2013.01); *G06F 21/105* (2013.01); *H04L 67/535* (2022.05); *G06F 21/1075* (2023.08)

(58) Field of Classification Search
CPC ................. G06F 21/629; G06F 21/105; G06F 2221/0768; H04L 67/535
(Continued)

(56) References Cited

U.S. PATENT DOCUMENTS 5,138,712 A 8/1992 Corbin
6,070,171 A 5/2000 Snyder et al.
(Continued)

FOREIGN PATENT DOCUMENTS

CN 104243435 A * 12/2014
CN 105893831 A * 8/2016
(Continued)

OTHER PUBLICATIONS

Chakravorty et al., "Architecture and implementation of a remote management framework for dynamically reconfigurable devices," Proceedings 10th IEEE International Conference on Networks (ICON 2002). Towards Network Superiority (Cat. No.02EX588), 2002, pp. 375-380, doi: 10.1109/ICON.2002.1033340. (Year: 2002).*
(Continued)

*Primary Examiner* — Peter C Shaw
(74) *Attorney, Agent, or Firm* — Wolf, Greenfield & Sacks, P.C.

(57) ABSTRACT

Described herein are techniques for a system to track usage of a software application on a remote device, without having connectivity to the remote device. The system transmits an activation token to a computing device different from the remote device to activate the software application, and receives a deactivation token generated by the remote device from the computing device when the software application is deactivated. The system uses transmission of an activation token and receipt of a deactivation token as indicators of start and end times of use of the software application. For example, the system uses the indicated start and end times to determine a billing period for use of the software application.

12 Claims, 10 Drawing Sheets

(58) Field of Classification Search
USPC .......................................................... 726/29
See application file for complete search history.

(56) References Cited

U.S. PATENT DOCUMENTS

| | | | |
|---|---|---|---|
| 6,363,486 | B1 | 3/2002 | Knapton, III |
| 8,332,631 | B2 | 12/2012 | Dadu et al. |
| 8,555,079 | B2 | 10/2013 | Shablygin et al. |
| 8,589,264 | B2 | 11/2013 | Clemm et al. |
| 8,843,415 | B2 | 9/2014 | Karabulut et al. |
| 9,003,541 | B1 | 4/2015 | Patidar |
| 9,600,674 | B2 | 3/2017 | Coffing et al. |
| 9,614,829 | B1* | 4/2017 | Molina-Markham ........................ H04L 63/08 |
| 10,019,558 | B2 | 7/2018 | Biswas et al. |
| 10,474,806 | B2 | 11/2019 | Taveau et al. |
| 10,574,692 | B2 | 2/2020 | Drake |
| 11,025,635 | B2* | 6/2021 | Patterson ............... H04L 63/102 |
| 2002/0007351 | A1 | 1/2002 | Hillegass et al. |
| 2002/0128976 | A1 | 9/2002 | O'Connor et al. |
| 2005/0044367 | A1 | 2/2005 | Gasparini et al. |
| 2005/0289072 | A1 | 12/2005 | Sabharwal |
| 2007/0067536 | A1* | 3/2007 | Borgatti ..................... G06F 8/61 710/300 |
| 2008/0215886 | A1 | 9/2008 | Nakagawa et al. |
| 2009/0094688 | A1* | 4/2009 | Roy .......................... H04L 67/02 726/7 |
| 2009/0310787 | A1* | 12/2009 | Nishimi ................... H04L 67/02 726/4 |
| 2011/0276501 | A1 | 11/2011 | Sako et al. |
| 2012/0131353 | A1* | 5/2012 | Nasir ....................... H04L 63/08 726/17 |
| 2012/0227098 | A1 | 9/2012 | Obasanjo et al. |
| 2013/0208893 | A1 | 8/2013 | Shablygin et al. |
| 2014/0075169 | A1* | 3/2014 | Andrews ............... G06F 9/4416 713/2 |
| 2015/0052351 | A1 | 2/2015 | Haghighi et al. |
| 2016/0165036 | A1* | 6/2016 | Leow ............... H04M 1/724095 455/557 |
| 2016/0246985 | A1 | 8/2016 | Burkhardt et al. |
| 2016/0357951 | A1* | 12/2016 | Fasoli ..................... G06F 21/44 |
| 2017/0161471 | A1 | 6/2017 | Brundridge et al. |
| 2018/0109540 | A1* | 4/2018 | Amar ................... H04L 63/0876 |
| 2019/0004744 | A1* | 1/2019 | Nakajima ............. G06F 3/1288 |
| 2019/0281449 | A1* | 9/2019 | Luo .......................... H04L 9/30 |
| 2019/0348165 | A1* | 11/2019 | Saint ................... A61B 5/14532 |
| 2021/0058778 | A1* | 2/2021 | Graessley ......... H04M 1/72463 |
| 2021/0118069 | A1* | 4/2021 | Deshmukh ........... G06Q 20/308 |

FOREIGN PATENT DOCUMENTS

| | | | | |
|---|---|---|---|---|
| CN | 113396571 | A * | 9/2021 | ............. G06F 9/547 |
| EP | 2584468 | A1 * | 4/2013 | ........... G06F 13/102 |
| JP | 2019-106212 | A | 6/2019 | |
| KR | 2010021134 | A * | 2/2010 | |
| WO | WO 2020/041594 | A1 | 2/2020 | |
| WO | WO-2021212086 | A1 * | 10/2021 | ............. A61B 5/0022 |

OTHER PUBLICATIONS

Agape et al., "Internet-enabled Access Control System using a Mobile Application," 2018 22nd International Conference on System Theory, Control and Computing (ICSTCC), 2018, pp. 244-249, doi: 10.1109/ICSTCC.2018.8540687. (Year: 2018).*

Ito et al., "Customizable Web-Based System to Federate Smart Devices and Peripherals," 2014 IEEE 38th International Computer Software and Applications Conference Workshops, 2014, pp. 584-589, doi: 10.1109/COMPSACW.2014.98. (Year: 2014).*

Beltran et al., "Overview of Device Access Control in the IoT and its Challenges," in IEEE Communications Magazine, vol. 57, No. 1, pp. 154-160, Jan. 2019, doi: 10.1109/MCOM.2017.1700433. (Year: 2019).*

Ito et al., "Customizable Web-Based System to Federate Smart Devices and Peripherals," 2014 IEEE 38th International Computer Software and Applications Conference Workshops, Vasteras, Sweden, 2014, pp. 584-589, doi: 10.1109/COMPSACW.2014.98. (Year: 2014).*

Gil-Castiñeira et al., "Remote Virtual Peripheral Framework: Enabling dynamically composed devices," 2011 IEEE Consumer Communications and Networking Conference (CCNC), Las Vegas, NV, USA, 2011, pp. 405-409, doi: 10.1109/CCNC.2011.5766501. (Year: 2011).*

Rahman et al., "Remote access and networked appliance control using biometrics features," in IEEE Transactions on Consumer Electronics, vol. 49, No. 2, pp. 348-353, May 2003, doi: 10.1109/TCE.2003.1209524. (Year: 2003).*

Chakravorty et al., "Architecture and implementation of a remote management framework for dynamically reconfigurable devices," Proceedings 10th IEEE International Conference on Networks (ICON 2002), 2002, pp. 375-380, doi: 10.1109/ICON.2002.103 (Year : 2002).*

Khan et al., "A tamper-resistant digital token-based rights management system," 2017 International Carnahan Conference on Security Technology (ICCST), Madrid, Spain, 2017, pp. 1-6, doi: 10.1109/CCST.2017.8167837. (Year: 2017).*

Dammak et al., "Token-Based Lightweight Authentication to Secure IoT Networks," 2019 16th IEEE Annual Consumer Communications & Networking Conference (CCNC), Las Vegas, NV, USA, 2019, pp. 1-4, doi: 10.1109/CCNC.2019.8651825. (Year : 2019).*

Demchenko et al., "Authorisation session management in on-demand resource provisioning in collaborative applications," 2009 International Symposium on Collaborative Technologies and Systems, Baltimore, MD, USA, 2009, pp. 201-208, doi: 10.1109/CTS.2009.5067482. (Year: 2009).*

Yang et al., "Implementation of Permission Management Framework Based on Token through Shiro," 2017 International Conference on Computer Technology, Electronics and Communication (ICCTEC), Dalian, China, 2017, pp. 1322-1325, doi: 10.1109/ICCTEC.2017.00290. (Year: 2017).*

Chen et al., "Using Session Identifiers as Authentication Tokens," 2009 IEEE International Conference on Communications, Dresden, Germany, 2009, pp. 1-5, doi: 10.1109/ICC.2009.5199560. (Year: 2009).*

Cacciari et al., "elasticLM: A Novel Approach for Software Licensing in Distributed Computing Infrastructures," 2010 IEEE Second International Conference on Cloud Computing Technology and Science, Indianapolis, IN, USA, 2010, pp. 67-74, doi: 10.1109/CloudCom.2010.19. (Year: 2010).*

Choudhary, "Software as a Service: Implications for Investment in Software Development," 2007 40th Annual Hawaii International Conference on System Sciences (HICSS'07), Waikoloa, HI, USA, 2007, pp. 209a-209a, doi: 10.1109/HICSS.2007.493. (Year: 2007).*

Noorian et al., "Autonomic Software License Management System: An Implementation of Licensing Patterns," 2009 Fifth International Conference on Autonomic and Autonomous Systems, Valencia, Spain, 2009, pp. 257-263, doi: 10.1109/ICAS.2009.15. (Year: 2009).*

* cited by examiner

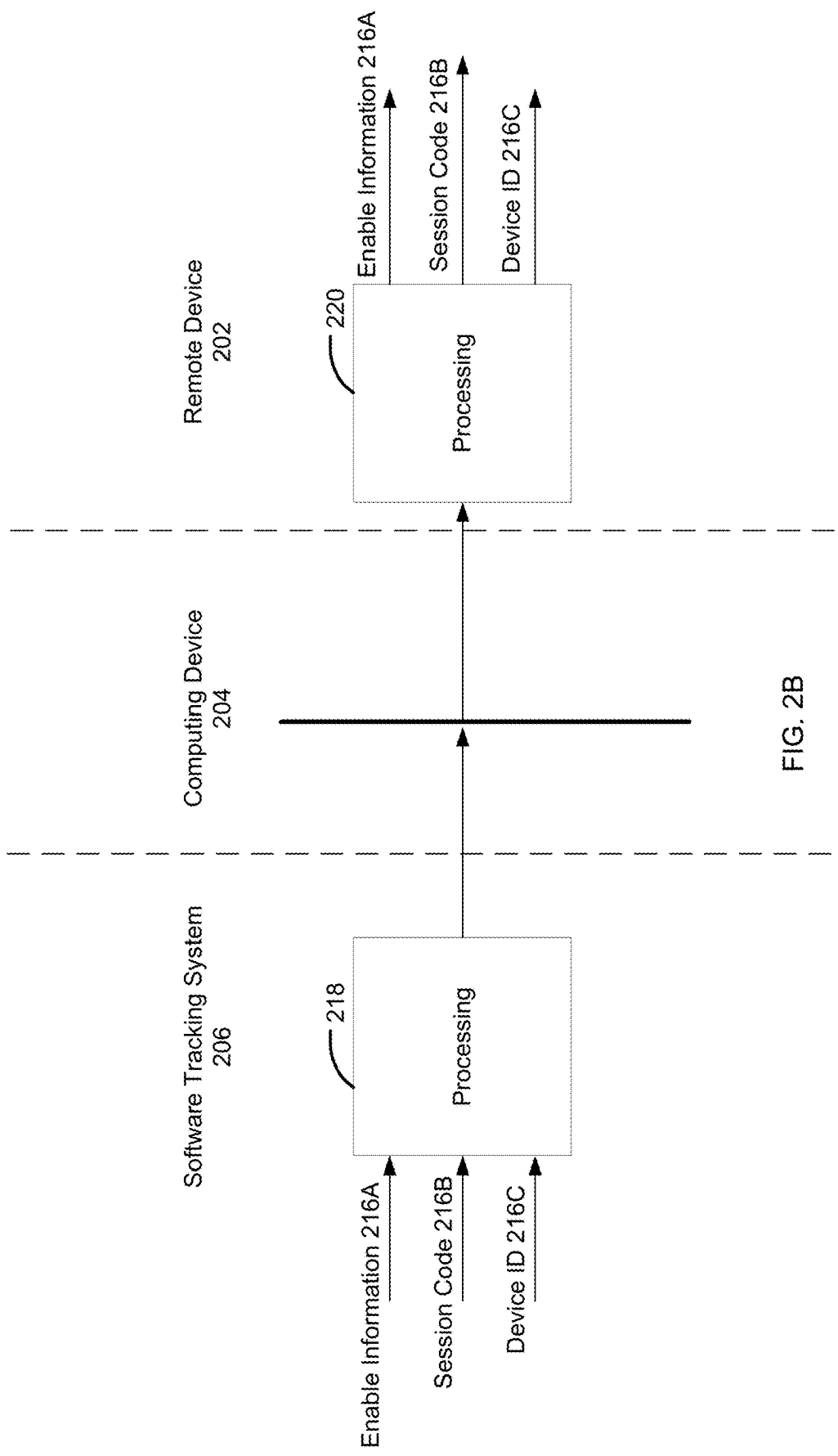

TECHNIQUES OF TRACKING SOFTWARE USAGE ON A REMOTE DEVICE

CROSS-REFERENCE TO RELATED APPLICATIONS

This application claims the benefit of U.S. Provisional Application Ser. No. 63/069,671 filed on Aug. 24, 2020, and entitled "TOKEN BASED METHOD TO TRACK SOFTWARE USAGE IN AN EMBEDDED DEVICE WITH NO DIRECT CONNECTIVITY OR RELIABLE TIME REFERENCE," which is hereby incorporated herein by reference in its entirety.

FIELD

This application relates to systems and techniques of tracking software usage on a remote device that does not have network connectivity (e.g., through the Internet) to a software provider.

BACKGROUND

Software may be provided to a device as a service through a subscription based model in which the device requests use of a software application, and a software provider grants use of the software application. Software may also be provided using a license in which a software provider allows use of its software application to one or more end users. The license may delineate the permitted use of the software application such as which features of the software application are usable by the user and/or a number of installations permitted by the user. The license may also specify limits on the use of the software application such as distribution, copying, modification of the software application, and other activities. A software license may remain active for a user as long as the user provides pays a subscription fee to the software provider.

BRIEF SUMMARY

Described herein are techniques for a system to track usage of a software application on a remote device, without having connectivity to the remote device. The system transmits an activation token to a computing device different from the remote device to activate the software application, and receives a deactivation token generated by the remote device from the computing device when the software application is deactivated. The system uses transmission of an activation token and receipt of a deactivation token as indicators of start and end times of use of the software application. For example, the system may use the indicated start and end times to determine a billing period for use of the software application.

According to some embodiments, a system for tracking usage of a software application by a remote device without having network connectivity to the remote device is provided. The system comprises: memory; wireless communication circuitry, and a processor configured to: receive, from a computing device separate from the remote device using the wireless communication circuitry, a request to activate one or more features of the software application on the remote device; transmit, to the computing device using the wireless communication circuitry, an activation token configured to activate at least a first feature of the one or more features of the software application on the remote device; and after transmitting the activation token, store, in the memory, an indication that the remote device has initiated use of at least the first feature of the software application.

According to some embodiments, a method for tracking usage of a software application by a remote device without having network connectivity to the remote device is provided. The method comprises using a processor to perform: receiving, from a computing device separate from the remote device, a request to activate one or more features of the software application on the remote device; transmitting, to the computing device, an activation token configured to activate at least a first feature of the one or more features of the software application on the remote device; and after transmitting the activation token, storing, in memory, an indication that the remote device has initiated use of at least the first feature of the software application.

According to some embodiments, a device configured to use a software application is provided. Use of the software application by the device is tracked by a system without network connectivity to the device. The device comprises: memory configured to store instructions to execute one or more features of the software application; and a processor configured to: receive, from a computing device separate from the device an activation token generated by the system to initiate a session of use of the software application on the device, wherein the activation token is configured to activate at least a first feature of the one or more features of the software application; and enable, using the activation token, at least the first feature of the software application on the device.

According to some embodiments, a method of using a software application by a device is provided. Use of the software application by the device is tracked by a system without network connectivity to the device. The device includes memory configured to store instructions to execute one or more features of the software application. The method comprises using a processor to perform: receiving, from a computing device separate from the device, an activation token generated by the system to initiate a session of use of the software application on the device, wherein the activation token is configured to activate at least a first feature of the one or more features of the software application; and enabling, using the activation token, at least the first feature of the software application on the device.

According to some embodiments, a device for relaying information between a remote device and a system that tracks usage of a software application by the remote device is provided. The system does not have network connectivity to the remote device. The device comprises: memory; wireless communication circuitry; and a processor configured to: transmit, to the system using the wireless communication circuitry, a request to activate one or more features of a software application on the remote device; receive, from the system using the wireless communication circuitry, an activation token generated by the system to initiate a session of use of the software application by the remote device, wherein the activation token is configured to activate at least a first feature of the one or more features of the software application; and transmit, to the remote device using the wireless communication circuitry, the activation token, wherein the activation token allows the remote device to enable at least the first feature of the software application on the remote device.

According to some embodiments, a method for relaying information between a remote device and a system that tracks usage of a software application by the remote device is provided. The system does not have network connectivity to the remote device. The method comprises using a processor to perform: transmitting, to the system, a request to activate one or more features of a software application on the remote device; receiving, from the system, an activation token generated by the system to initiate a session of use of the software application by the remote device, wherein the activation token is configured to activate at least a first feature of the one or more features of the software application; and transmitting, to the remote device, the activation token, wherein the activation token allows the remote device to enable at least the first feature of the software application on the remote device.

BRIEF DESCRIPTION OF DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

FIG. 2B illustrates a process of activating one or more features of a software application, according to some embodiments of the technology described herein.

DETAILED DESCRIPTION

Figure 1A:
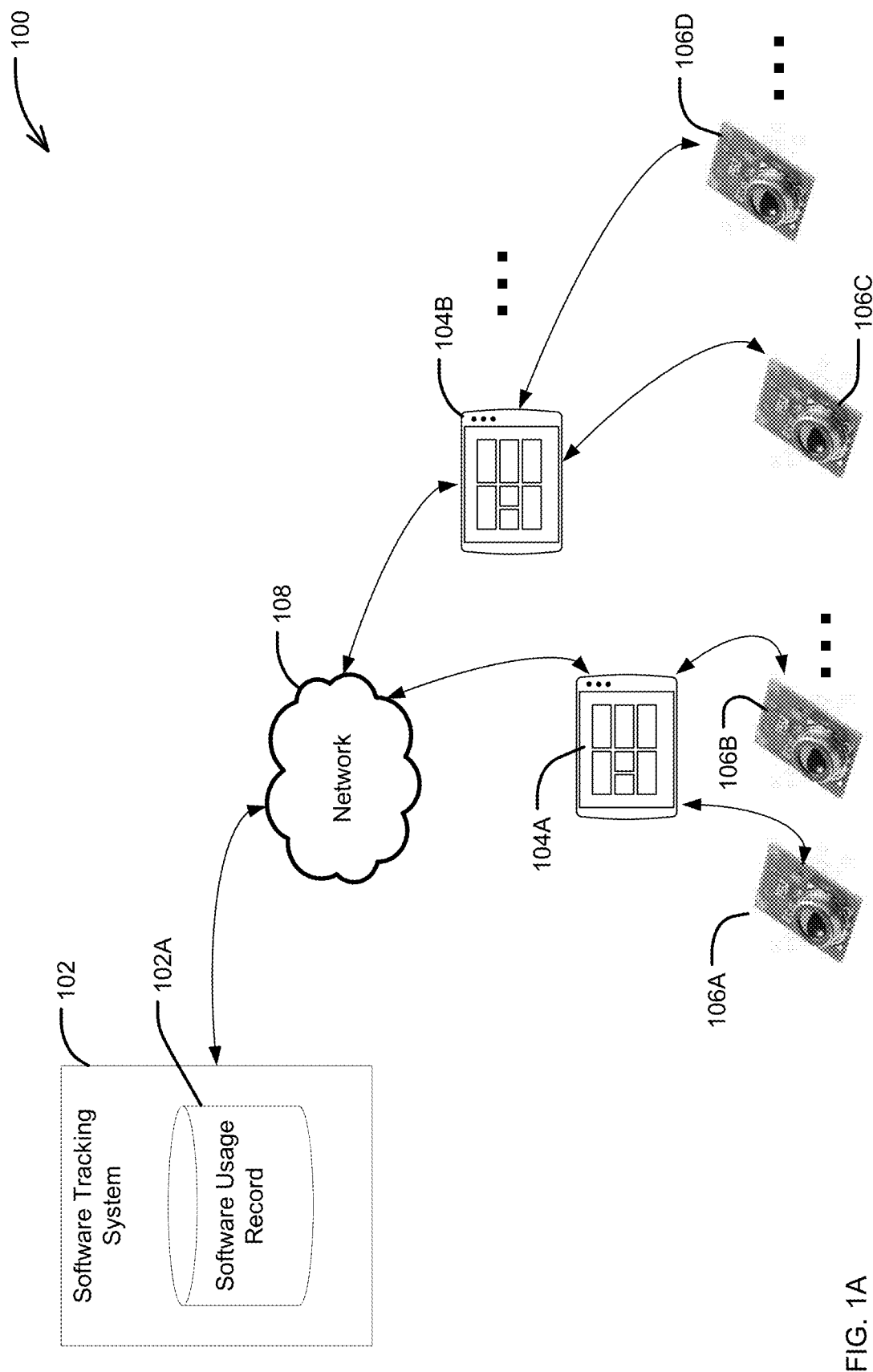
FIG. 1A illustrates an example system for tracking use of a software application by remote devices, according to some embodiments of the technology described herein.

Conventional techniques for a software provider to provide a software application to a device involve using a license. When the license is activated, it allows the device to use the software application. For example, the software provider may activate a license on a device for a duration of subscription time (e.g., for a day, up to a week, up to a month, up to 3 months, up to 6 months, up to 1 year, for multiple years, etc.) and deactivate the license once the duration of time has elapsed. When the license is deactivated, the device may be unable to use the software application. For example, the device may be prevented from accessing the software application when the license is deactivated.

In general, using licenses to deliver software to a device requires a system to have connectivity to the device (e.g., through a network connection). For example, a system (e.g., a server) operated by a software provider ("licensor system") may need connectivity to communicate with a device licensing the software. The licensor system may transmit a license file to the device through a network (e.g., the Internet), and maintain communication with the device through a duration of the license to activate and/or deactivate the license on the device (e.g., based on a subscription). Moreover, conventional license based techniques typically require the device to have a reliable time reference that a licensor system can use to accurately determine time elapsed since activation of a license. The licensor system uses the time reference to enforce the license on the device (e.g., by deactivating the license upon expiration of a subscription time period).

The inventors have recognized limitations of conventional techniques of delivering a software application to a device. First, there may be instances where a software provider needs to provide a software application to a device that does not have connectivity to a licensor system. For example, the software provider may need to provide the software application to a sensor that does not have connectivity outside of a local network (e.g., a ZIGBEE network) and thus cannot communicate with a licensor system through the Internet. The lack of connectivity may be desirable (e.g., for security reasons) or a limitation of the environment or hardware of the device. As a result, conventional license based techniques may not be suitable, as they rely on connectivity of a licensor system to the device in order to activate and/or deactivate a license for the software application on the device.

The inventors have further recognized that certain devices may not have access to a reliable time reference. For example, a device without Internet connectivity may not have access to a reliable time reference (e.g., a coordinated universal time or other world clock). The inventors have also recognized that using an internal time reference of the remote device (e.g., a real-time clock) may be unsuitable because the internal time reference can be controlled by the device and, as a result, does not provide a reliable measurement of time to a licensor system (e.g., because the device may modify the time). Moreover, an internal time reference may depend on hardware of the device, and thus be susceptible to removal and failure of device hardware. For these reasons, conventional techniques, in which a licensor system typically requires a reliable time reference to manage a license, are unsuitable for providing a software application to a device without Internet connectivity.

The inventors have developed techniques for tracking usage of a software application by a device that do not require the device to have external connectivity (e.g., through the Internet to a licensor system), or to have access to a time reference. The techniques may allow a system to track usage of a software application by a device that does not have connectivity to the system (a "remote device"). For example, the remote device may be a sensor deployed in an environment, and the techniques may allow a system to track usage of a software application by the sensor. To illustrate, the remote device may be a smart building sensor (e.g., temperature sensor, humidity sensor, motion sensor, air quality sensor, or other type of sensor), a battery monitor integrated with an electric vehicle battery, an aircraft engine sensor, or other type of sensor. The techniques may further allow the system to control the device's access to features of the software application on the remote device. For example, the techniques may allow the system to activate and/or deactivate features of the software application on the remote device (e.g., based on a subscription of a customer associated with the remote device).

In some embodiments, a system for tracking usage of a software application by a remote device may communicate with a computing device, separate from the remote device. The system may receive, from the computing device, a request to enable one or more features of a software application on the remote device. The system may generate an activation token that allows the remote device to enable use of the feature(s) of the software application. The system may transmit the activation token to the computing device, which may in turn transmit the activation token to the remote device. The system may use its transmission of the activation token as an indication that the remote device has initiated use of the feature(s) of the software application. For example, the system may store an indication that the remote device has initiated use of the feature(s) of the software application after transmission of the activation token. When the remote device has stopped use of the feature(s) of the software application, it may transmit a deactivation token to the computing device. The system may receive the deactivation token from the computing device, and use the deactivation token as an indication that the remote device has stopped use of the feature(s) of the software application. For example, the system may store an indication that the remote device has stopped use of the feature(s) of the software application. The system may use the time between transmission of an activation token and receipt of a deactivation token as an indication of the amount of time that the remote device used the feature(s) of the software application. For example, the system may use the time to determine a billing period for a customer associated with the remote device.

FIG. 1A illustrates an example system 100 for tracking use of a software application by remote devices 106A, 106B, 106C, 106D, according to some embodiments of the technology described herein. The system 100 includes a software tracking system 102, computing devices 104A, 104B, remote devices 106A, 106B, 106C, 106D, and a network 108.

The software tracking system 102 may by a computing device. For example, the software tracking system 102 may be a desktop computer, a server, a laptop, a mobile device, or any other computing device. In some embodiments, the software tracking system 102 may include multiple computing devices. For example, the software tracking system 102 may be a cloud-based system that comprises of multiple computing devices and storage resources located in different locations. The multiple computing devices and storage resources may be in communication with each other through a network connection (e.g., through the Internet). The software tracking system 102 may include hardware for wireless communication (e.g., through network 108). The software tracking system 102 may include wireless communication circuitry. In some embodiments, the wireless communication circuitry may be in a network interface device of the software tracking system 102. For example, the network interface device may be a modem, a network interface card, or other suitable network interface device. The software tracking system 102 may be configured to use the wireless communication circuitry to communicate with computing devices 104A, 104B. The wireless communication circuitry may allow the software tracking system 102 to communicate with other devices through a network (e.g., network 108). For example, the wireless communication circuitry may allow the software tracking system 102 to communicate with other devices through the Internet.

The software tracking system 102 may be configured to manage activation of a software application in one or more remote devices (e.g., remote devices 106A, 106B, 106C, 106D). In some embodiments, the software tracking system 102 may be configured to receive a request to activate one or more features of the software application on a remote device. In response to the request, the software tracking system 102 may be configured to generate an activation token. The activation token may allow the remote device to enable use of the feature(s) of the software application on the remote device. For example, the software tracking system 102 may include information in the activation token (e.g., an activation code, software instructions, one or more keys, and/or other information) that the remote device may use to enable the feature(s) on the remote device. Example techniques for generating an activation token are described herein with reference to FIGS. 2A-2B. The software tracking system 102 may be configured to transmit the activation token to a computing device (e.g., computing device 104A, 104B) to relay to the remote device.

The software tracking system 102 may be configured to manage deactivation of a software application by one or more remote devices (e.g., remote devices 106A, 106B, 106C, 106D). In some embodiments, the software tracking system 102 may be configured receive a deactivation token indicating that a remote device has stopped use of one or more features of the software application. For example, the deactivation token may include identifiers (e.g., codes) associated with the feature(s) of the application indicating that the feature(s) have been disabled on the remote device. The software tracking system 102 may be configured to use the deactivation token as an indication that the remote device has stopped use of the feature(s) of the software application. Example techniques for deactivating feature(s) of a software application on the remote device are described herein with reference to FIG. 2C.

As illustrated in FIG. 1A, the software tracking system 102 stores a software usage record in memory 102A of the software tracking system 102. In some embodiments, the memory 102A may be a hard drive of the software tracking system 102. For example, the memory 102A may be a hard disk drive, a solid state hard drive, or other type of hard drive of the software tracking system 102. In some embodiments, the memory 102A may comprise of multiple data storage resources (e.g., hard drives) located in different locations. For example, the memory 102A may be a distributed database of the software tracking system 102. In some embodiments, the memory 102A may be cloud-based storage of the software tracking system 102. For example, the memory 102A may comprise of storage resources provided by a cloud-based storage system (e.g., AMAZON WEB SERVICES cloud database, GOOGLE cloud database, or other cloud-based storage system).

The software tracking system 102 may be configured to store a record of software usage by remote devices in the memory 102A. In some embodiments, the software tracking system 102 may be configured to store, in the record, information indicating when a remote device initiates use of feature(s) of a software application and when the remote device stops use of the feature(s) of the software application. The record may be used to bill a customer for use of the software application. For example, the record may be used to determine a time that feature(s) of the software application were used by remote device(s) of the customer, and an amount to bill the customer based on the time. In some embodiments, the software usage record may include records for individual remote devices. For example, the record may include indications of time at which a remote device began use of feature(s) of a software application and stopped use of the feature(s). A record for each remote device may be indicated by a device identifier. In some embodiments, the software usage record may include records for different customers. For example, the record may include indications of when a customer began use of feature(s) of a software application and stopped use of the feature(s). In some embodiments, the software usage record may include a table or other data structure for storing the information. For example, the software usage record may include one or more CSV files, JSON files, EXCEL files, text files, or other type of file.

Each of computing devices 104A, 104B may be any suitable computing device. For example, the computing device may be a mobile device (e.g., smart phone, laptop, tablet, smart watch, or another suitable mobile device). In some embodiments, a computing device may be a computing device located proximate one or more remote devices. To illustrate, the computing device may be a tablet on a building floor where one or more of the remote devices are located. The computing device may be associated with a party (e.g., a customer of a software application).

A computing device may be configured to communicate with the software tracking system 102 (e.g., through the network 108), and a respective set of one or more remote devices. In the example of FIG. 1A, the computing device 104A may communicate with remote devices 106A, 106B, and with the software tracking system 102. The computing device 104B may communicate with remote devices 106C, 106D, and with the software tracking system 102. The computing device may act as a relay between the software tracking system 102 and a remote device which does not have connectivity to the software tracking system 102. The computing device may include wireless communication circuitry that it can use to communicate through the network 108 with the software tracking system 102. Examples of wireless circuitry are described herein. In some embodiments, the computing device may be configured to communicate with a remote device wirelessly. For example, the computing device may communicate with the remote device through a local network (e.g., a ZIGBEE network) that may be accessible proximate the remote device. In some embodiments, the computing device may be configured to communicate with a remote device through a physical connection. For example, the computing device may have a wired connection to the remote device through which the computing device communicates with the remote device.

A computing device may be configured to initiate activation of a software application on a remote device. In some embodiments, the computing device may be configured to initiate activation of a software application by transmitting an activate command to the remote device. For example, a customer may initiate use of a software application by commanding a remote device using the computing device. The computing device may then receive a request from the remote device to activate one or more features of the software application. For example, the computing device may transmit a command instructing the remote device to activate feature(s) of the software application. The computing device then receives a request message from the remote device requesting activation of the feature(s) of the software application. The computing device may transmit the request to the software tracking system 102 (e.g., through network 108). In some embodiments, the computing device may be configured to initiate activation of a software application by transmitting a request to activate feature(s) of the software application to the software tracking system 102 without transmitting a command to the remote device. The computing device may be configured to receive an activation token that activates the feature(s) of the software application, and transmit the activation token to the remote device (e.g., to allow the remote device to use the feature(s) of the software application).

A computing device may be configured to initiate deactivation of feature(s) of a software application on a remote device. The computing device may be configured to initiate deactivation of the feature(s) by transmitting a command to the remote device instructing the device to deactivate the feature(s). For example, the computing device may transmit a message including instructions identifying the feature(s), and commanding the remote device to disable the feature(s). A customer may command a remote device to stop usage of a software application by using the computing device to transmit the command. The computing device may be configured to receive a deactivation token from the remote device indicating that the remote devices has disabled the feature(s) of the software application. The computing device may be configured to transmit the deactivation token to the software tracking system 102 (e.g., to indicate that the remote device has stopped using the feature(s)).

A remote device (e.g., any of remote devices 106A, 106B, 106C, 106D) may not have connectivity to the software tracking system 102. The remote device may not be able to communicate through the network 108. In some embodiments, the remote device may include wireless communication circuitry that is unable to or otherwise restricted from communicating through network 108. For example, the wireless communication circuitry may not be able to communicate outside a local network (e.g., a ZIGBEE network). In another example, the wireless communication circuitry may not have range to communicate with the software tracking system 102 through the network 108. As an illustrative example, a remote device may be a smart building sensor that is unable to communicate with devices outside of a building in which the sensor is deployed. As another example, a remote device may be a battery monitor integrated with a battery of an electric vehicle, and may only be able to communicate with certain communication hubs. As yet another example, a remote device may be an aircraft engine sensor integrated in an engine that is restricted to communicating with certain devices at an airport.

A remote device may be configured to communicate with a computing device proximate the remote device. In the example of FIG. 1A, remote devices 106A, 106B may communicate with computing device 104A, and remote devices 106C, 106D may communicate with computing device 104B. In some embodiments, the remote device may include wireless communication circuitry configured to communicate with devices within a local network proximate the device. For example, the remote device may include BLUETOOTH that allows the remote device to communicate with devices located proximate the remote device. In another example, the remote device may include a radio communication circuit that allows the remote device to communicate with devices located proximate the remote device. The wireless communication circuit may be configured to communicate with devices within in a radius of 10 feet, 100 feet, or 1000 feet. In another example, the wireless communication circuitry may allow the remote device to communicate with devices in a ZIGBEE network. In some embodiments, the remote device may be configured to communicate with a computing device through a wired connection. For example, the remote device may be connected to the computing device using a universal serial bus (USB) or other type of wired connection.

A remote device may be configured to use tokens to activate and deactivate a software application (e.g., for which usage is tracked by software tracking system 102). The remote device may be configured to receive, from a computing device, an activation token generated by the software tracking system 102 to initiate a session of use of the software application. The activation token may be configured to activate one or more features of a software application. The remote device may be configured to use the activation token to enable the feature(s) of the software application. When the remote device disables the feature(s) of the software application, the remote device may transmit a deactivation token to the computing device indicating that that feature(s) of the application have been disabled by the remote device. In some embodiments, the remote device may be configured to disable the feature(s) and generate a deactivation command in response to a command from a computing device. For example, the remote device may generate the deactivation command in response to a message from the computing device instructing the remote device to stop use of the software application. Example techniques of generating a deactivation token are described herein with reference to FIG. 2C.

The network 108 of FIG. 1A may be a communication network. For example, the network 108 may be the Internet, a local area network, a wide area network, and/or any other type of communication network.

Figure 1B:
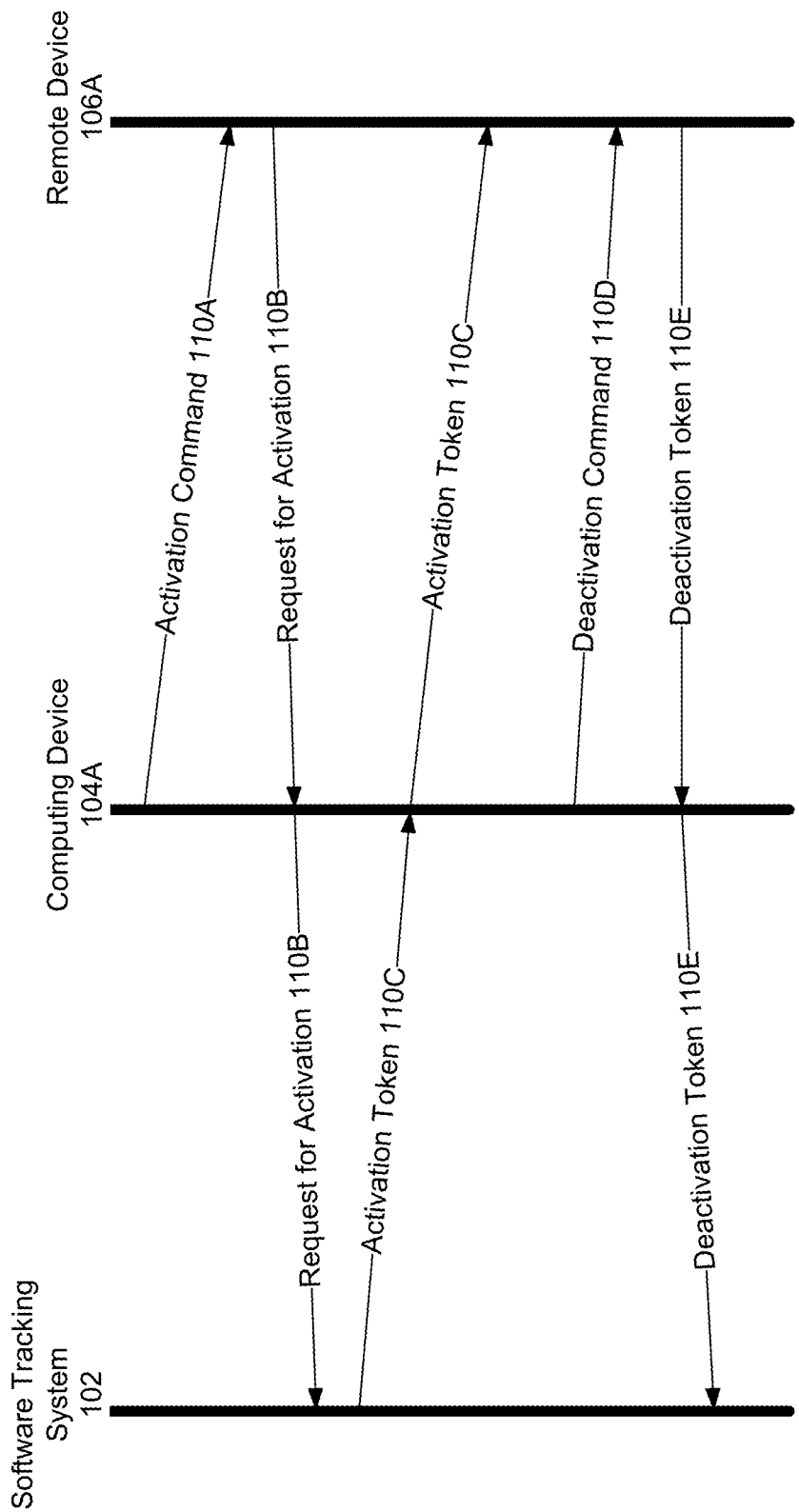
FIG. 1B illustrates a sequence diagram of communication in the system of FIG. 1A for tracking usage of a software application on the remote device, according to some embodiments of the technology described herein.

FIG. 1B illustrates a sequence diagram of communication in the system 100 of FIG. 1A for tracking usage of a software application on the remote device, according to some embodiments of the technology described herein. The example communications of FIG. 1B may occur among software tracking system 102, computing device 104A, and remote device 106A. The sequence begins with the computing device 104A transmitting an activation command 110A to the remote device 106A. The activation command 110A may command the remote device 106A to activate one or more features of the software application. The remote device 106A may be configured to transmit a request 110B for activation of the feature(s) to the computing device 104A after receiving the activation command 110A. The computing device 104A may transmit the request 110B for activation of the feature(s) to the software tracking system 102. The software tracking system 102 may then generate and transmit an activation token 110C to the computing device 104A. The computing device 104A may transmit the activation token 110C to the remote device 106A. The activation token 110A allows the remote device 106A to enable the feature(s) on the remote device 106A. The computing device 104A may transmit a deactivation command 110D to the remote device 106A to stop use of the feature(s) of the software application. The remote device 106A then generates and transmits a deactivation token 110E to the computing device 104A indicating that the remote device 106A has stopped use of the feature(s) of the software application (e.g., by disabling the feature(s) on the remote device 106A). The computing device 104A may transmit the deactivation token 110E to the software tracking system.

Figure 1C:
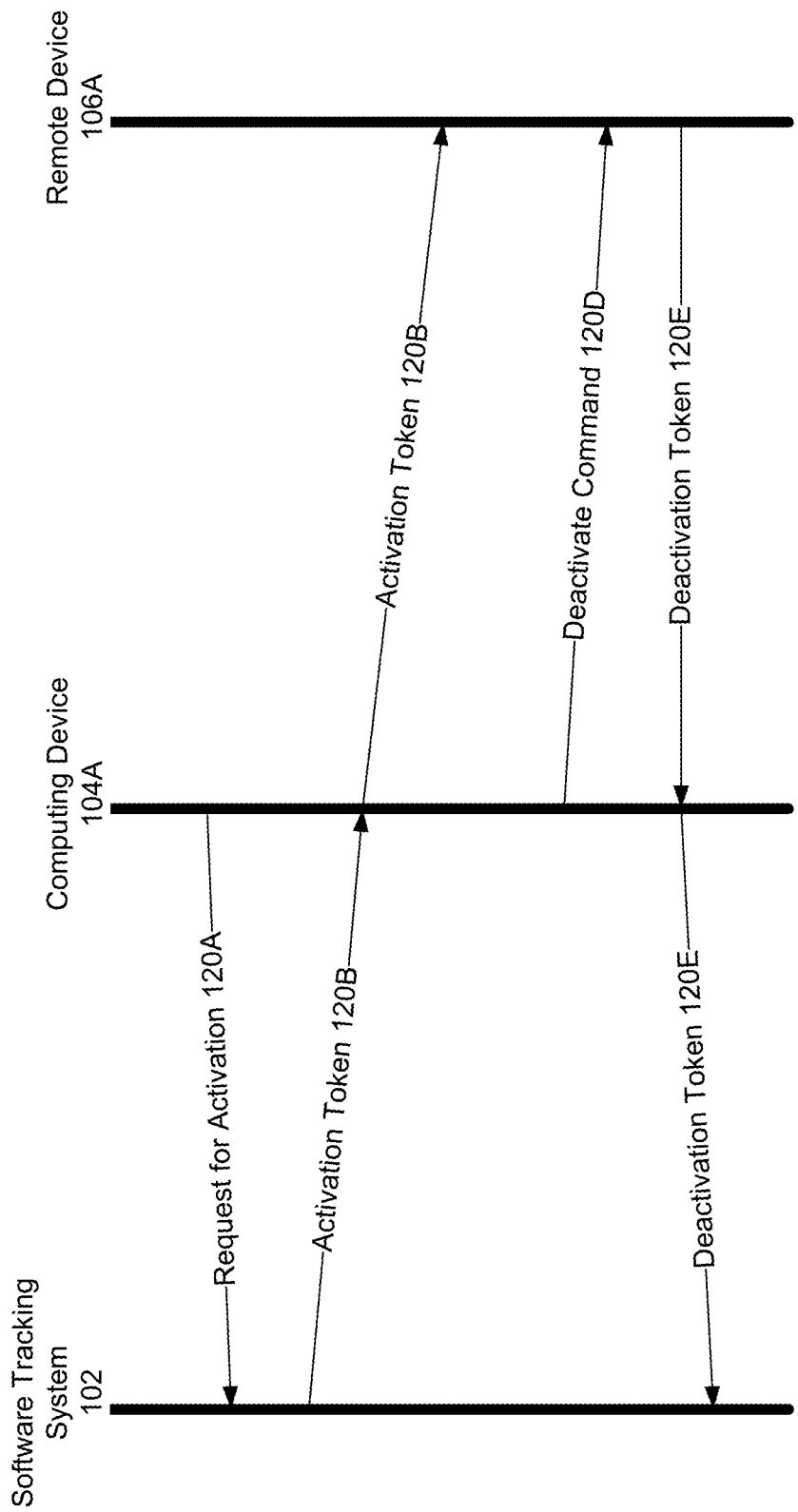
FIG. 1C illustrates another sequence diagram of communication in the system of FIG. 1A for tracking usage of a software application on the remote device, according to some embodiments of the technology described herein.

FIG. 1C illustrates another sequence diagram of communication in the system of FIG. 1A for tracking usage of a software application on the remote device, according to some embodiments of the technology described herein. The example communications of FIG. 1C may occur among software tracking system 102, computing device 104A, and remote device 106A. The sequence begins with the computing device 104A transmitting a request 120A for activation to the software tracking system 102. The software tracking system 102 then generates and transmits an activation token 120B to the computing device 104A. The computing device 104A transmits the activation token 120B to the remote device 106A. The remote device 106A may use the activation token 120B to enable feature(s) of the software application. To deactivate the feature(s) of the software application, the computing device 104A may transmit a deactivate command 120D to the remote device 106A. After receiving the deactivate command 120D, the remote device 106A may stop use of the feature(s) of the software application (e.g., by disabling the feature(s)), and generate and transmit a deactivation token 120E to the computing device 104A. The computing device 104A may transmit the deactivation token 102E to the software tracking system 102 to indicate that the remote device 106A has stopped use of the feature(s) of the software application.

In some embodiments, the software tracking system 102 may be configured to use a time at which the activation token 110C is transmitted by the software tracking system 102 as an indication of when the remote device 106A started using feature(s) of a software application. For example, the software tracking system 102 may use the time as a start of a billing cycle for use of the software application. The software tracking system 102 may be configured to store, in its software usage record, an indication that the remote device 106A has initiated use of the feature(s). The software tracking system 102 may be configured to use a time at which the deactivation token 110E is received by the software tracking system 102 as an indication when a remote device has stopped using feature(s) of the software application. For example, the software tracking system 102 may use the time as the end of a billing cycle. The software tracking system 102 may be configured to store, in its software usage record, an indication that the remote device 106A has stopped use of the feature(s). In some embodiments, the software tracking system 102 may be configured to identify the time at which an activation token was transmitted and/or a deactivation token was received using a time reference. For example, the software tracking system 102 may use a coordinated universal time or world clock to determine the time. In another example, the software tracking system 102 may include a clock that the software tracking system 102 uses to determine the times.

Figure 2A:
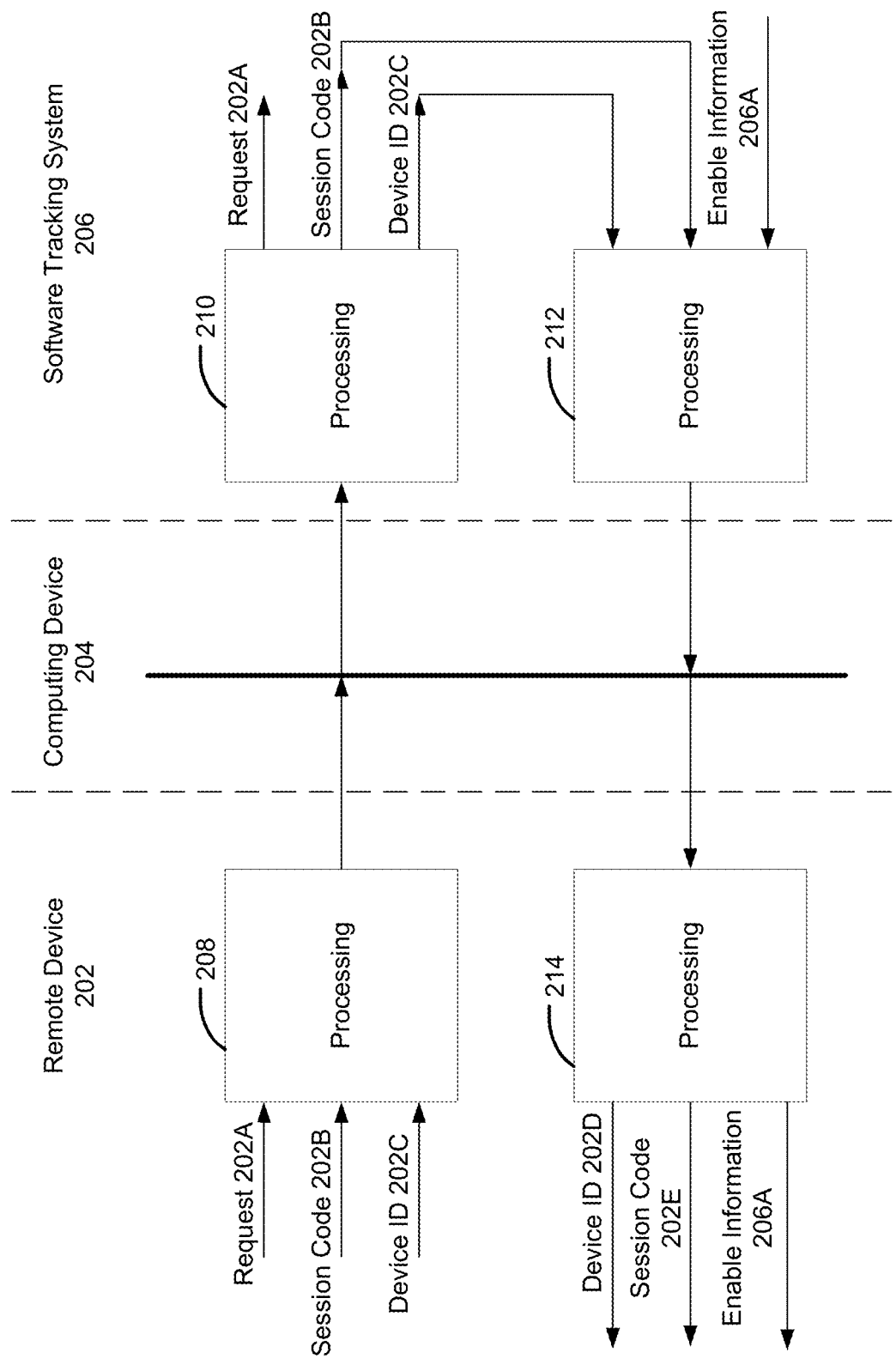
FIG. 2A illustrates a process of activating one or more features of a software application, according to some embodiments of the technology described herein.

FIG. 2A illustrates a process of activating one or more features of a software application, according to some embodiments of the technology described herein. The process illustrated by FIG. 2A may be performed by a remote device 202, a computing device 204 separate from the remote device 202, and a software tracking system 206. In some embodiments, the process illustrated by FIG. 2A may be initiated when the computing device 204 transmits an activation command (e.g., activation command 110A of FIG. 1B) to the remote device 202. In some embodiments, the process illustrated by FIG. 2A may be initiated by the remote device 202 (e.g., without a command from the computing device 204).

The remote device 202 may generate a request for activation by performing processing 208. The processing 208 comprises: (1) generating a request 202A indicating one or more features of the software application to activate on the remote device 202; (2) generating a session code 202B for a period of use of the feature(s) of the software application; and (3) including a device identifier 202C in the request. In some embodiments, the request 202A may encode an identification of the feature(s) of the software application that the remote device 202 is requesting to activate. For example, the request 202A may encode identifiers for the feature(s) of the software application. In some embodiments, the remote device 202 may be configured to generate the session code 202B by generating one or more random numbers. For example, the remote device 202 may generate a true random pattern (TRP) to be the session code 202B. In some embodiments, the device identifier 202C may be a unique identifier of the remote device 202 to differentiate the remote device 202 from other remote devices.

In some embodiments, the processing 208 may comprise encrypting a message including the request 202A, the session code 202B, and the device identifier 202C. For example, the remote device 202 may perform asymmetric encryption in which the remote device 202 uses a public key corresponding to a private key of the software tracking system 206 to encrypt the message. In another example, the remote device 202 may perform symmetric encryption in which the remote device 202 uses a key shared by the software tracking system 202 to encrypt the message. The remote device 202 may be configured to transmit the encrypted message to the computing device 204, which in turn transmits the message to the software tracking system 206.

The software tracking system 206 performs processing 210 to obtain the request 202A, the session code 202B, and the device identifier 202C transmitted by the remote device 202 (e.g., in an encrypted message). In some embodiments, the processing 210 may include decrypting an encrypted message transmitted by the remote device 202. For example, the software tracking system 206 may perform an asymmetric decryption using a private key to obtain the request 202A, session code 202B, and device identifier 202C from the message. In another example, the software tracking system 206 may perform a symmetric decryption using a key to obtain the request 202A, session code 202B, and the device identifier 202C.

The software tracking system 206 performs processing 212 to generate an activation token. The software tracking system 206 generates an activation token including the session code 202B, the device identifier 202C, and enable information 206A. In some embodiments, the software tracking system 206 may be configured to determine which of the feature(s) specified in the request 202A the remote device 202 is permitted to use. For example, the software tracking system 206 may check a subscription account of a customer associated with the remote device 202 to determine whether the feature(s) have been paid for. In another example, the software tracking system 206 may determine whether the remote device 202 meets the requisite requirements (e.g., software and/or hardware requirements) to use the feature(s) specified by the request 202A. In some embodiments, the enable information 206A may include instructions that, when executed by the remote device 202, cause the remote device 202 to enable at least one of the feature(s) indicated by the request 202A (e.g., feature(s) that the system 206 determined the remote device 202 is permitted to use). In some embodiments, the enable information 206A may include one or more keys that can be used by the remote device 202 to enable feature(s) of the software application.

The processing 212 may include encrypting a message including the activation token. For example, the software tracking system 206 may perform asymmetric encryption using a public key corresponding to a private key of the remote device 202. In another example, the software tracking system 206 may perform symmetric encryption using a symmetric key that is shared with the remote device 202. The software tracking system 206 may be configured to transmit the encrypted message to the computing device 204, which in turn transmits the message to the remote device 202.

The remote device 202 performs processing 214 to obtain the device identifier 202D, session code 202E, and enable information 206A from the activation token. In some embodiments, the remote device 202 may be configured decrypt a message received from the computing device 204. The remote device 202 may be configured to use the enable information 206A to enable feature(s) of the software application. For example, the remote device 202 may execute instructions included in the enable information 206A that cause the remote device 202 to enable the feature(s). In another example, the remote device 202 may use key(s) included in the enable information 206A to enable the feature(s).

FIG. 2B illustrates another process of activating one or more features of a software application, according to some embodiments of the technology described herein. The process illustrated by FIG. 2B may be performed by a remote device 202, a computing device 204 separate from the remote device 202, and a software tracking system 206. In some embodiments, the process illustrated by FIG. 2B may be initiated when the computing device 204 transmits a request for activation (e.g., request for activation 120A of FIG. 1C) to the software tracking system 206.

The software tracking system 206 may be configured to generate enable information 216A, obtain a session code 216B, and obtain a device identifier 216C. In some embodiments, the software tracking system 206 may be configured to receive the session code 216B and the device identifier 216C from the computing device 204. For example, the session code 216B and the device identifier 216C may be included in a request for activation received from the computing device 204.

The software tracking system 206 performs processing 218 to generate an activation token. The software tracking system 206 generates an activation token including the session code 216B, the device identifier 216C, and enable information 216A. The software tracking system 206 may be configured to determine which of the feature(s) specified in a request (e.g., from the computing device 204) the remote device 202 is permitted to use. For example, the software tracking system 206 may check a subscription account of a customer associated with the remote device 202 to determine whether the feature(s) have been paid for. In another example, the software tracking system 206 may determine whether the remote device 202 meets the requisite requirements (e.g., software and/or hardware requirements) to use the feature(s) specified by the request 202A. In some embodiments, the enable information 216A may include instructions that, when executed by the remote device 202, cause the remote device 202 to enable at least one of the feature(s) (e.g., feature(s) that the system 206 determined the remote device 202 is permitted to use). In some embodiments, the enable information 216A may include one or more keys that can be used by the remote device 202 to enable feature(s) of the software application.

In some embodiments, the processing 218 may include encrypting a message including the activation token. For example, the software tracking system 206 may perform asymmetric encryption using a public key corresponding to a private key of the remote device 202. In another example, the software tracking system 206 may perform symmetric encryption using a symmetric key that is shared with the remote device 202. The software tracking system 206 may be configured to transmit the encrypted message to the computing device 204, which in turn transmits the message to the remote device 202.

The remote device 202 performs processing 220 to obtain the enable information 216A, the session code 216B, and the device identifier 216C from the activation token received from the computing device 204. In some embodiments, the remote device 202 may be configured decrypt a message received from the computing device 204. The remote device 202 may be configured to use the enable information 216A to enable feature(s) of the software application. For example, the remote device 202 may execute instructions included in the enable information 206A that cause the remote device 202 to enable the feature(s). In another example, the remote device 202 may use key(s) included in the enable information 206A to enable the feature(s).

In some embodiments, the processing 220 may include determining whether the session code 216B in the activation token matches a previous session code associated with a previous session of usage of the software application. For example, the software application may cause the remote device 202 to store session codes for all sessions of usage of the software application. The remote device 202 may check, upon receipt of an activation token, whether a session code included in the activation token matches a previously stored session code. When the remote device 202 determines that the session code 216B matches a previous session code, the remote device 202 may be prevented from enabling feature(s) of the software application using the enable information 216A. For example, the software application may not allow the remote device 202 to enable the feature(s) when it determines that the session code 216B matches a previous session code (e.g., to prevent a customer from reusing a previous session code to circumvent billing).

Figure 2C:
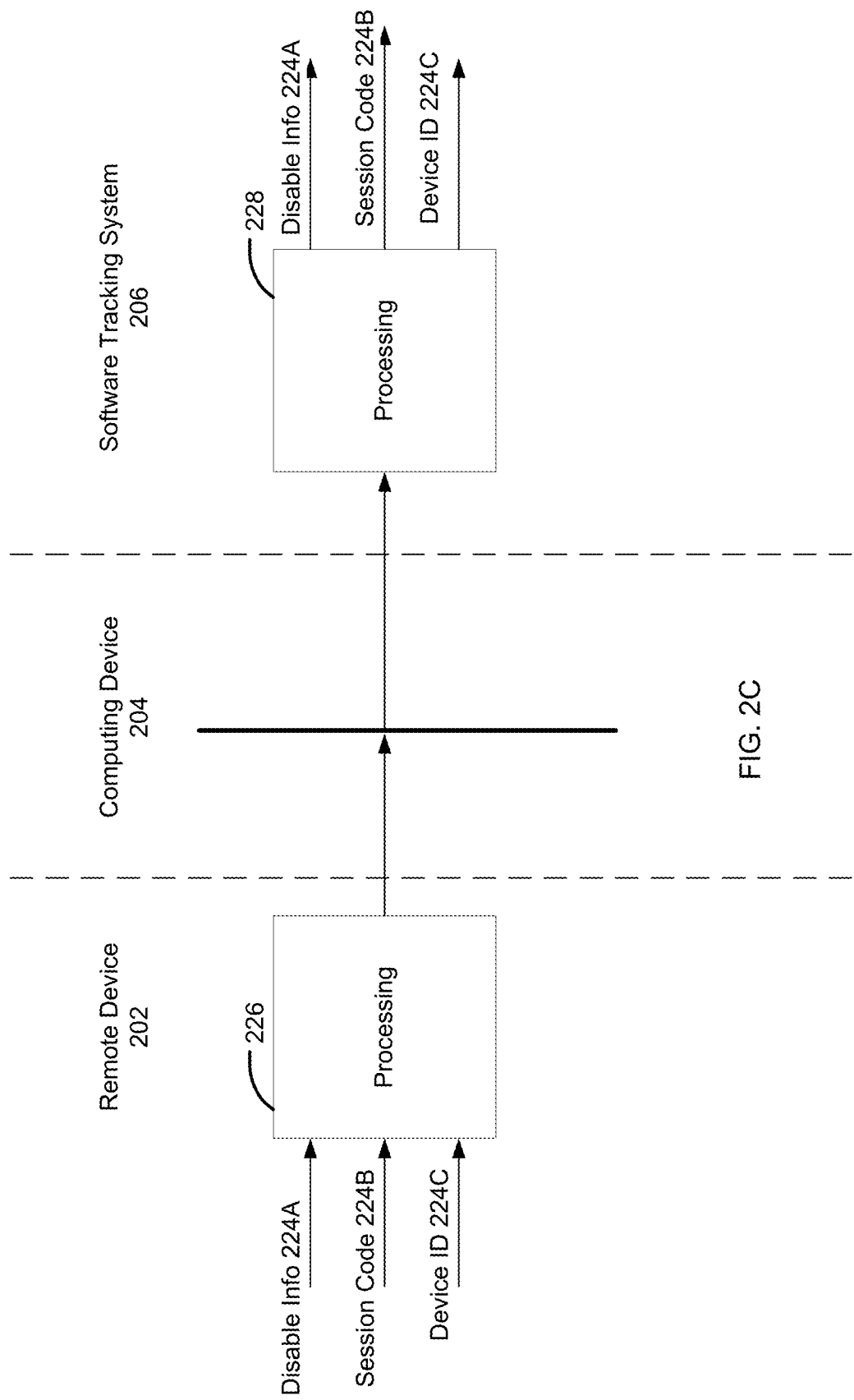
FIG. 2C illustrates a process of deactivating one or more features of a software application, according to some embodiments of the technology described herein.

FIG. 2C illustrates a process of deactivating one or more features of a software application, according to some embodiments of the technology described herein. The process illustrated by FIG. 2C may be performed by a remote device 202, a computing device 204 separate from the remote device 202, and a software tracking system 206. In some embodiments, the process illustrated by FIG. 2C may be initiated when the computing device 204 transmits a deactivation command (e.g., deactivation command 110D of FIG. 1B) to the remote device 202.

The remote device 202 may be configured to generate a deactivation token. The remote device 202 may be configured to generate a deactivation token by generating disable information 224A indicating that the remote device 202 has disabled the feature(s) of the software application. For example, after disabling the feature(s) of the software application, the remote device 202 may store information in a file indicating the feature(s) that were disabled. The remote device 202 may be configured to generate the deactivation token using the disable information 224A. The remote device 202 may be configured to include a session code 224B associated with use of the feature(s) and a device identifier 224C in the deactivation token. For example, the session code 224B may have been previously generated and/or received by the remote device 202 when the feature(s) were activated. The remote device 202 performs processing 226 to generate the deactivation token. In some embodiments, the processing 226 includes generating an encrypted message. For example, the remote device 202 may perform symmetric or asymmetric encryption to generate an encrypted message. The remote device 202 may be configured to transmit the message to the computing device 204, which transmits the message to the software tracking system 206.

The software tracking system 206 performs processing 228 to obtain the disable information 224A, the session code 234B, and the device identifier 224C. In some embodiments, the processing 228 may include decrypting an encrypted message (e.g., using a symmetric or asymmetric key). The software tracking system 206 may be configured to use the disable information 224A to determine that the remote device 202 has stopped use of the feature(s) of the application indicated by the disable information 224A. The software tracking system 206 may be configured to store an indication that the remote device 202 has stopped use of the feature(s) of the software application. The software tracking system 206 may be configured to use the session code 224B to determine that a session of use of the feature(s) has ended. For example, the software tracking system 206 may determine that the session code 224B matches a session code associated with a previous activation of the feature(s). The software tracking system 206 may store the session code 224B in conjunction with activation and deactivation times in memory of the software tracking system 206 (e.g., in software usage record 102A). The software tracking system 206 may be configured to use the device identifier 224C to identify a record associated with the remote device 202. The software tracking system 206 may be configured to store an indication that the remote device 202 has stopped use of the feature(s) of the software application in a record for the remote device 202.

Figure 3:
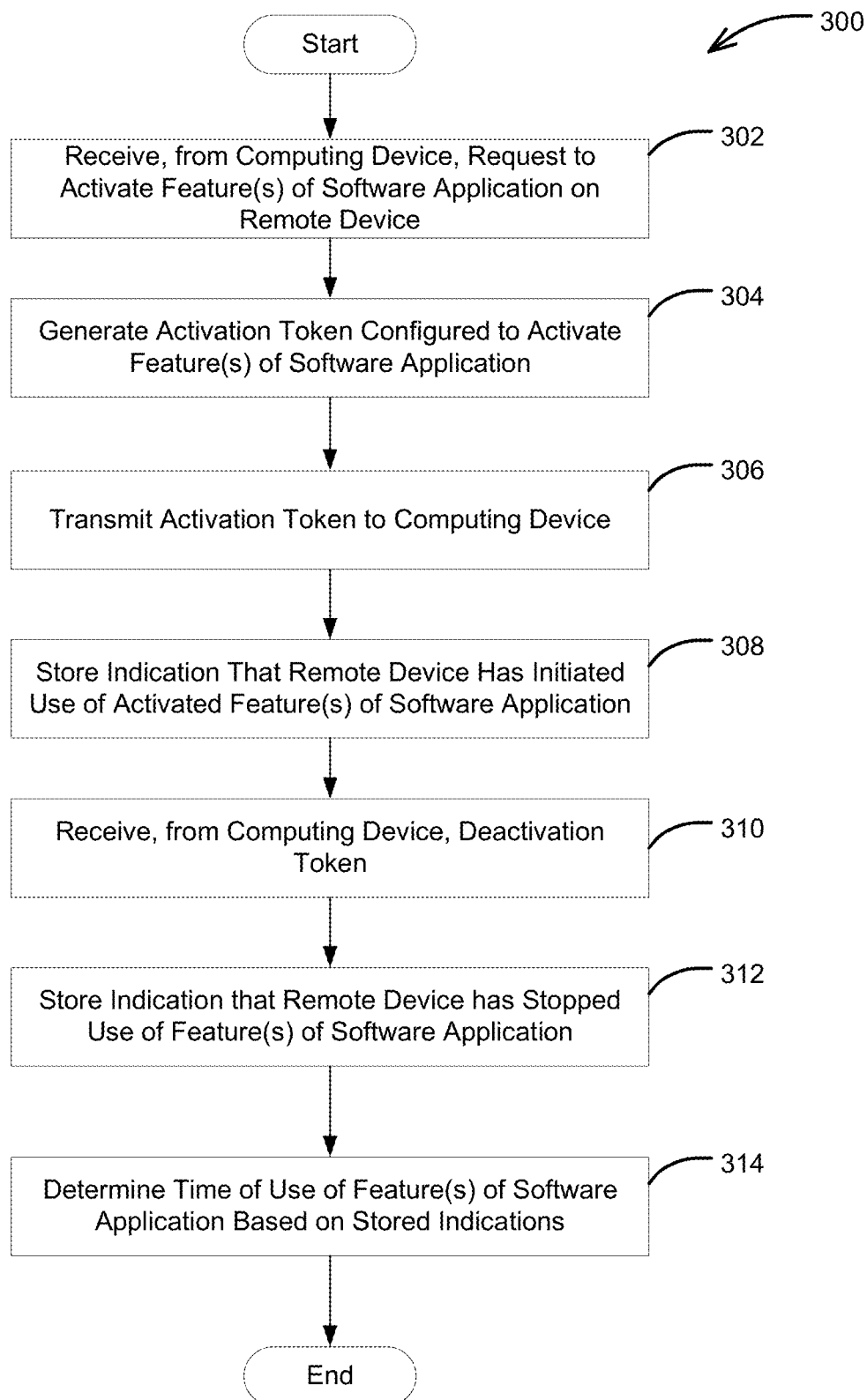
FIG. 3 illustrates an example process of tracking use of a software application by a remote device, according to some embodiments of the technology described herein.

FIG. 3 illustrates an example process 300 of tracking use of a software application by a remote device, according to some embodiments of the technology described herein. In some embodiments, method 300 may be performed by any suitable computing device. For example, the method 300 may be performed by software tracking system 102 described herein with reference to FIGS. 1A-1C.

The process 300 begins at block 302, where the system receives, from a computing device separate from the remote device, a request to activate one or more features of a software application on a remote device. The system may be configured to receive a request as described herein with reference to FIGS. 2A-2B. For example, the request may include information identifying the feature(s) of the software application that are being requested for activation, a session code, and an identifier for the remote device.

Next, process 300 proceeds to block 304, where the system generates an activation token configured to activate at least one of the feature(s) that that request indicated. In some embodiments, the system may be configured to: (1) determine which of the requested feature(s) the remote device is permitted to use; and (2) configure the activation token to activate the determined feature(s). In some embodiments, the system may be configured to configure the activation token by generating instructions that allow the remote device to enable the determined feature(s) of the software application. In some embodiments, the system may be configured to configure the activation token by including information (e.g., key(s)) that the remote device may use to enable the determined feature(s). The system may be configured to generate the activation token as described herein with reference to FIGS. 2A-2C. For example, the system may include, in the activation token, a session code and a device identifier of the remote device along with enable information.

Next, process 300 proceeds to block 306, where the system transmits the activation token to the computing device. In some embodiments, the system may be configured to transmit the activation token to the computing device using wireless communication circuitry (e.g., in a network interface card) of the system. For example, the system may transmit the activation token through the Internet to the computing device.

Next, process 300 proceeds to block 308, where the system stores an indication (e.g., in memory of the system) that the remote device has initiated use of the feature(s) of the software application activated by the activation token. In some embodiments, the system may be configured to store a time at which the transmission was performed as indicating when the remote device began use of the feature(s) of the software application. For example, the system may obtain a time (e.g., using an external clock or an internal clock) at which the system transmitted the activation token and store the time as a starting time at which the remote device began use of the feature(s) of the software application. In some embodiments, the system may be configured to store a session code marking a session of use of the feature(s) of the software application by the remote device. The system may be configured to store the record in association with an identifier of the remote device (e.g., in a table or file associated with the device identifier).

Next, process 300 proceeds to block 310, where the system receives, from the computing device, a deactivation token. The deactivation token may include information indicating feature(s) of the software application that have been disabled by the remote device. For example, the deactivation token may indicate code(s) identifying the disabled feature(s) of the software application. In some embodiments, the deactivation token may include a session code identifying a session of use of the feature(s) (e.g., included in the activation token) and a device identifier identifying the remote device.

Next, process 300 proceeds to block 312, there the system stores an indication that the remote device has stopped use of the feature(s) of the software application indicated by the deactivation token. The system may be configured to use a session code included in the deactivation token to identify an activation time (e.g., by finding a matching session code). The system may be configured to store an indication that the remote device has stopped use of the feature(s) of the software application. For example, the system may store a deactivation time associated with the identified session code in a software usage record. The system may be configured to store a record associated with the device identifier of the remote device (e.g., in a file or table associated with the device identifier).

Next, process 300 proceeds to block 314, where the system determines a time of use of the feature(s) of the software application based on the stored indications. The system may be configured to determine an amount of time that the remote device used the feature(s) of the software application based on an amount of time that elapsed between transmission of the activation token (e.g., at block 306) and receipt of the deactivation token (e.g., at block 310). The system may be configured to use the determined time for managing provision of the software application for the remote device. For example, the system may use the determined time to deduct from a remaining time of use of the software application for a customer, and/or to determine an amount to bill the customer associated with the remote device. In another example, the system may use the determined time to determine whether the remote device is permitted to subsequently use the feature(s) of the software application (e.g., in response to a subsequent activation request).

Figure 4:
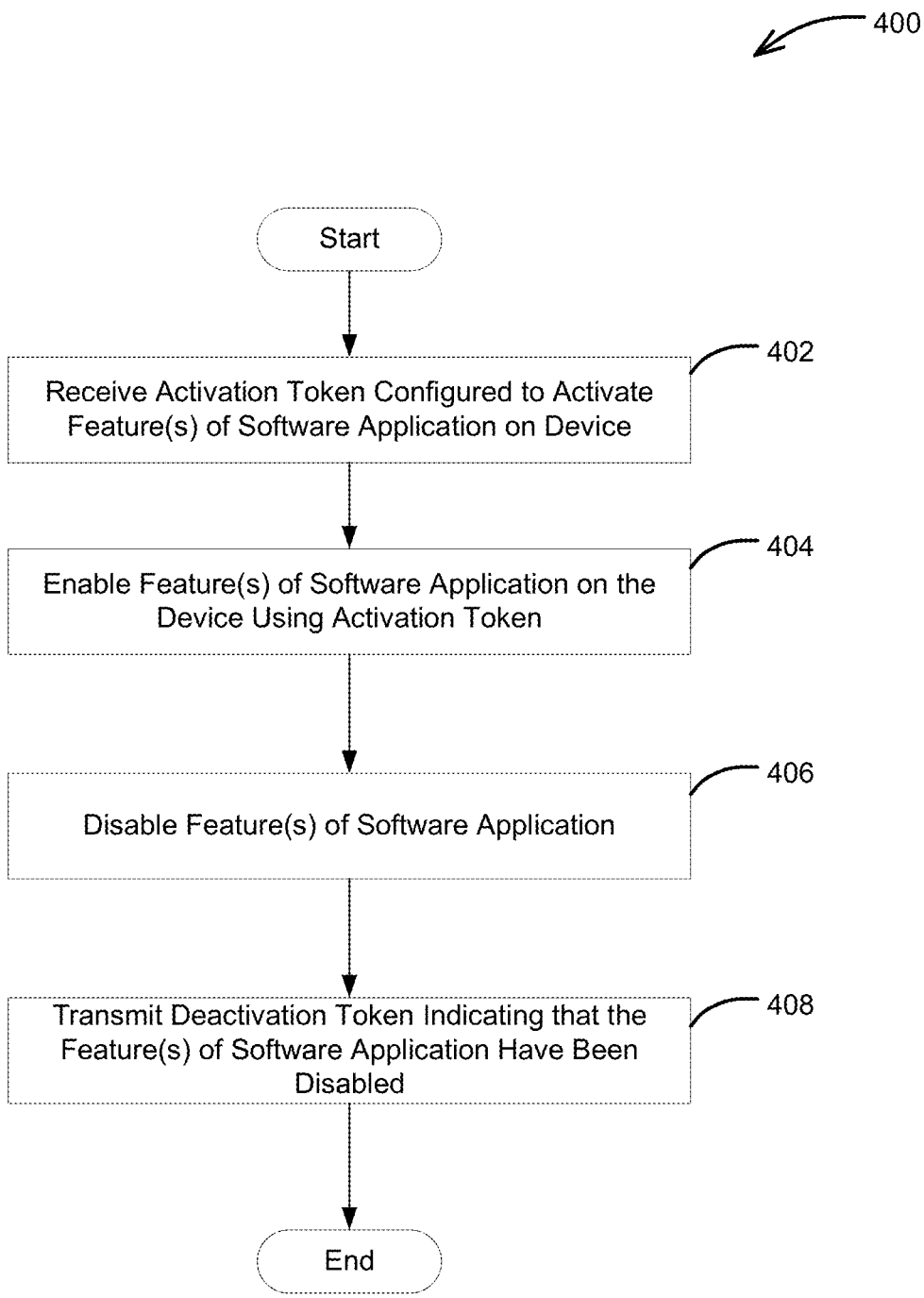
FIG. 4 illustrates an example process of activating and deactivating one or more features of a software application on a remote device, according to some embodiments of the technology described herein.

FIG. 4 illustrates an example method 400 of activating and deactivating one or more features of a software application by a remote device, according to some embodiments of the technology described herein. For example, the method 400 may be performed by one of the remote devices 106A, 106B, 106C, 106D described herein with reference to FIGS. 1A-1C.

In some embodiments, the device may be configured to generate an activation request prior to performing process 400 (e.g., as described herein with reference to FIG. 2A). The device may be configured to include, in the activation request, a request to activate the feature(s) of the software application, a session code, and a device identifier. In some embodiments, a computing device separate from the device performing process 400 may be configured to generate an activation request prior to performance of process 400 (e.g., as described herein with reference to FIG. 2B). The computing device may be configured to include, in the activation request, a request to activate the feature(s) of the software application, a session code, and a device identifier for the device performing process 400. The activation request may be used by a system (e.g., software tracking system 102) to generate an activation token.

Process 400 begins at block 402, where the device receives an activation token configured to activate the feature(s) of the software application on the device. In some embodiments, the activation token may include information that the device may use to enable the feature(s) of the software application (e.g., as described herein with reference to FIGS. 2A-2B). For example, the authentication token may include one or more keys that the device may use to enable the feature(s) of the software application. In another example, the authentication token may include instructions that may be executed by the device to enable the feature(s) of the software application. The activation token may include a session code associated with a session of use of the feature(s) of the software application. The activation token may include device identifier of the device.

Next, process 400 proceeds to block 404, where the device enables the feature(s) of the software application on the device using the activation token. For example, the device may execute instructions encoded in the activation token to cause the device to enable the feature(s) of the software application. In another example, the device may use key(s) included in the activation token to enable the feature(s) of the software application. In some embodiments, the device may be configured to use a session code included in the activation token to determine whether to enable the feature(s) of the software application. For example, the device may be configured to determine whether the session code matches a session code that was included in an activation request transmitted to the system (e.g., by the device performing process 400 or another computing device). In this example, if the device determines that the session code in the activation token matches one included in the activation request, the device may use the activation token to enable the feature(s). Otherwise, the device may not be able to use the activation token to enable the feature(s) (e.g., due to the software application preventing the device from enabling the feature(s)). In another example, the device may determine whether the session code matches a session code associated with a previous session of use of the software application. In this example, the device may determine whether the session code in the activation token matches one previously stored in memory of the device. If the device determines that the session code does not match a previously stored session code, the device may use the activation token to enable the feature(s) of the software application. Otherwise, the device may not be able to use the activation token to enable the feature(s) of the software application (e.g., due to the software application preventing the device from enabling the feature(s)).

Next, process 400 proceeds to block 406, where the device disables the feature(s) of the software application on the device. The device may be configured to disable the feature(s) after a period of time. For example, the device may no longer need the functionality provided by the feature(s) of the software application, and thus may disable the feature(s). In another example, the device may disable the feature(s) after a configurable period of time. The device may be configured to disable the feature(s) of the software application by stopping use of the feature(s). The device may be configured to generate information indicating that the feature(s) have been disabled on the device. In some embodiments, the device may be configured to disable the feature(s) in response to a command from another computing device.

Next, process 400 proceeds to block 408, where the device transmits a deactivation token indicating that the feature(s) of the software application have been disabled. The device may be configured to transmit the deactivation token to a computing device, which in turn transmits the deactivation token to another system (e.g., through a network). The device may be configured to generate the deactivation token (e.g., as described herein with reference to FIG. 2C). The deactivation token may include disable information indicating the feature(s) that have been disabled by the device, a session code, and a device identifier. The deactivation token may provide an indication to the system that the device has stopped use of the feature(s) of the software application (e.g., to mark an end of a billing cycle for use of the feature(s)). The session code may allow the system to match the deactivation token with an activation token previously transmitted to the device.

Figure 5:
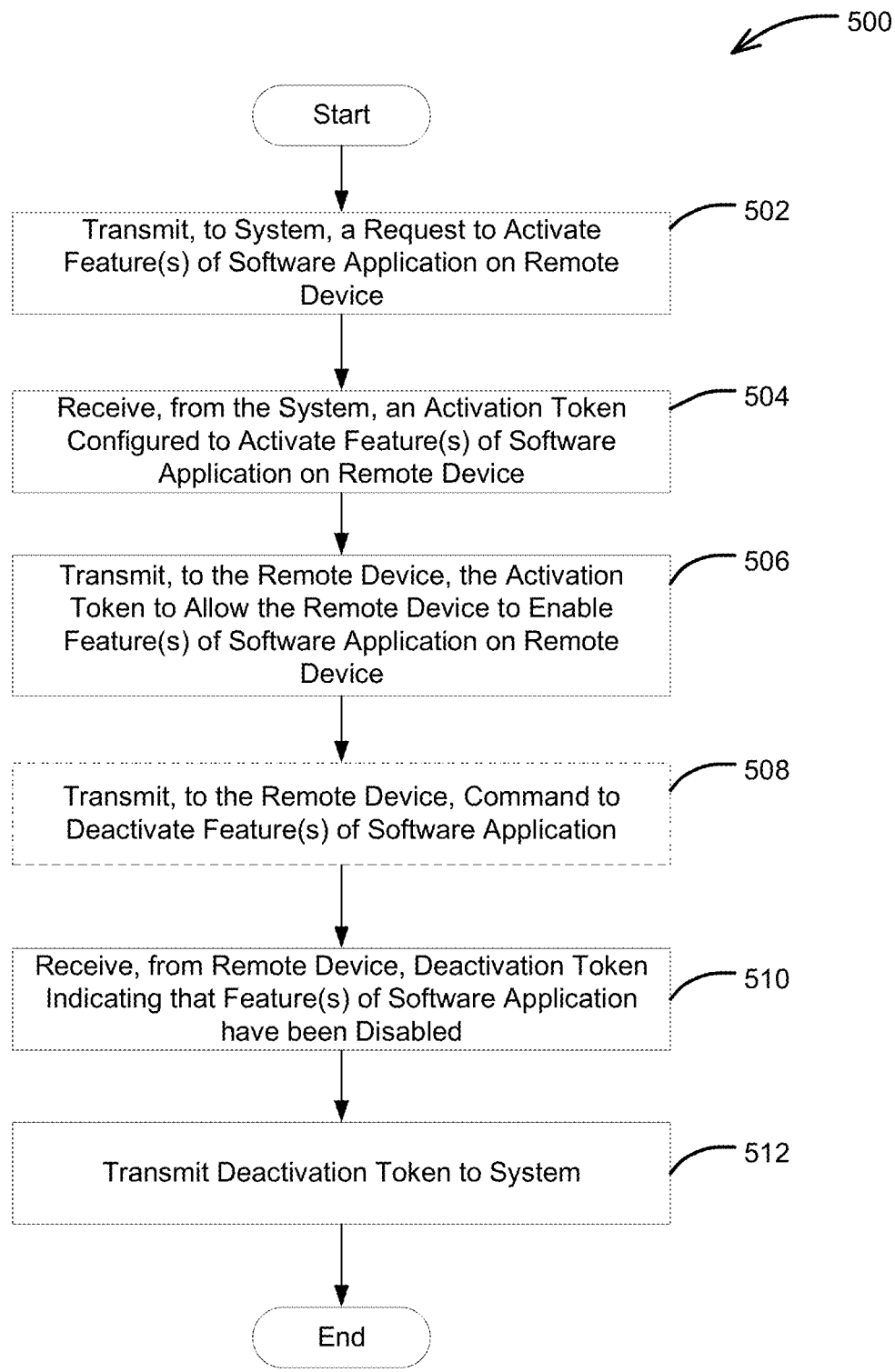
FIG. 5 illustrates an example process of relaying information between a system and a remote device for activating and deactivating one or more features of a software application, according to some embodiments of the technology described herein.

FIG. 5 illustrates an example process 500 of relaying information between a system and a remote device for activating and deactivating one or more features of a software application, according to some embodiments of the technology described herein. The process 500 may be performed by any suitable computing device. For example, the process 500 may be performed by one of computing devices 104A, 104B described herein with reference to FIGS. 1A-1C.

Process 500 begins at block 502, where the device transmits, to a system (e.g., software tracking system 102), a request to activate the feature(s) of the software application on the remote device. In some embodiments, the device performing process 500 may be configured to generate the activation request. The device may be configured to include, in the activation request, a request to activate the feature(s) of the software application, a session code, and a device identifier. In some embodiments, the remote device may be configured to generate an activation request and transmit it to the device performing process 500. The device performing process 500 may transmit the activation request received from the remote device to the system.

Next, process 500 proceeds to block 504, where the device receives, from the system, an activation token configured to active one or more of the features of the software application included in the activation request on the remote device. For example, the feature(s) of the software application configured to be activated by the activation token may be those the system has determined that the remote device is permitted to use.

Next, process 500 proceeds to block 506, where the device transmits, to the remote device, the activation token to allow the remote device to enable the feature(s) of the software application that the activation token is configured to activate. The remote device can use the feature(s) of the software application.

Next, process 500 proceeds to block 508, where the device transmits, to the remote device, a command to deactivate the feature(s) of the software application that had been activated using the activation token. For example, the device may transmit a message including an instruction to disable the feature(s) of the software application. As indicated by the dotted lines of block 508, in some instances, process 500 may not include block 508 as the remote device may deactivate the feature(s) of the software application without a command from the device performing process 500.

Next, process 500 proceeds to block 510, where the device receives, from the remote device, a deactivation token indicating that the remote devices has stopped using the feature(s) of the software application (e.g., by disabling the feature(s)). The deactivation token may include information as described herein with reference to FIG. 2C.

Next, process 500 proceeds to block 512, where the device transmits the deactivation token to the system. The deactivation token may allow the system to determine that the remote device has stopped using (e.g., disabled) the feature(s) of the software application. For example, the deactivation token may allow the system to identify the end of a billing cycle for use of the software application.

Figure 6:
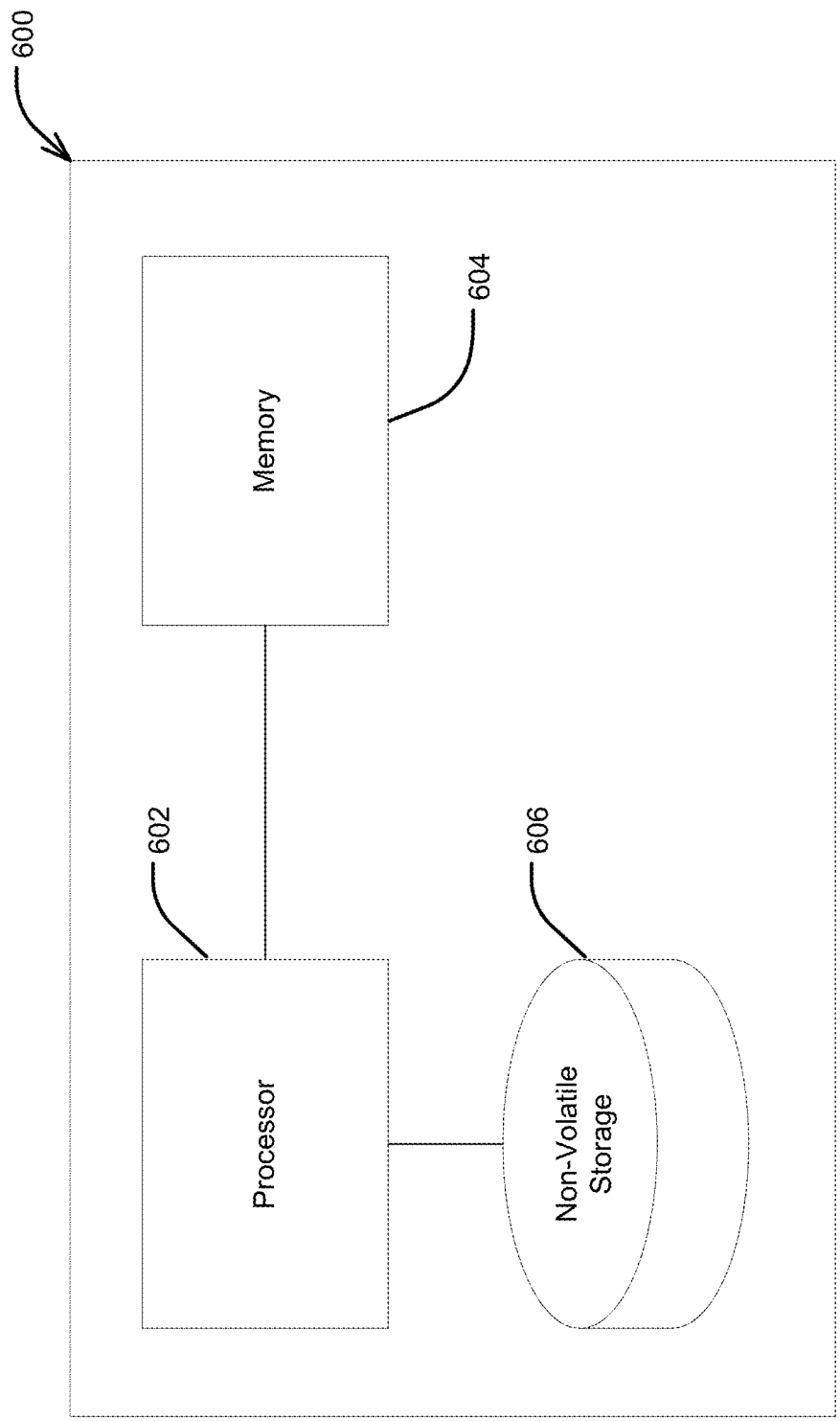
FIG. 6 illustrates an example computing device that may be used to implement some embodiments of the technology described herein.

FIG. 6 illustrates an example computing device 600 that may be used to implement some embodiments of the technology described herein. The computing device 600 may include one or more computer hardware processors 602 and non-transitory computer-readable storage media (e.g., memory 604 and one or more non-volatile storage devices 606). The processor(s) 602 may control writing data to and reading data from (1) the memory 604; and (2) the non-volatile storage device(s) 606. To perform any of the functionality described herein, the processor(s) 602 may execute one or more processor-executable instructions stored in one or more non-transitory computer-readable storage media (e.g., the memory 604), which may serve as non-transitory computer-readable storage media storing processor-executable instructions for execution by the processor(s) 602.

A processor may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device (e.g., an FPGA). As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

What is claimed is:

1. A system for tracking usage of a software application by a remote device without having network connectivity to the remote device, the system comprising:
   memory;
   wireless communication circuitry; and
   a processor configured to:
      receive, from a computing device separate from the remote device using the wireless communication circuitry, a request to activate one or more features of the software application on the remote device, the request including a session code generated by the remote device;
      generate an activation token comprising the session code generated by the remote device for a session of using the software application by the remote device;
      transmit, to the computing device using the wireless communication circuitry, the activation token to be relayed to the remote device by the computing device, the activation token configured to activate at least a first feature of the one or more features of the software application on the remote device; and
      after transmitting the activation token, store, in the memory, an indication that the remote device has initiated use of at least the first feature of the software application, the indication comprising a start time for the session of use of the software application,
   wherein the session code enables activation of at least the first feature of the software application when the session code is different from one or more previous session codes corresponding to one or more previous sessions of use of the software application.

2. The system of claim 1, wherein the processor is further configured to:
   receive, from the computing device using the wireless communication circuitry, a deactivation token indicating that the remote device has disabled the first feature of the software application; and
   after receiving the deactivation token, store, in the memory, an indication that the remote device has stopped use of the first feature of the software application.

3. The system of claim 2, wherein the processor is further configured to:
   determine an amount of time that the remote device used the first feature of the software application based on the stored indication that the remote device has initiated use of the first feature of the software application and the stored indication that the remote device has stopped use of the first feature of the software application.

4. The system of claim 1, wherein the processor is further configured to:
   determine whether the remote device is permitted to use the first feature of the software application; and
   configure the activation token to allow the remote device to enable, using the activation token, the first feature based on determining that the remote device is permitted to use the first feature of the software application.

5. The system of claim 1, wherein the processor is further configured to:
   determine that the remote device is not permitted to use a second feature of the one or more features of the software application; and
   configure the activation token to activate the first feature without activating the second feature on the remote device.

6. A system for tracking usage of a software application by a remote device without having network connectivity to the remote device, the system comprising:
   memory;
   wireless communication circuitry; and
   a processor configured to:
      receive, from a computing device separate from the remote device using the wireless communication circuitry, a request to activate one or more features of the software application on the remote device, the request including a session code generated by the remote device;
      generate an activation token comprising the session code generated by the remote device for a session of using the software application by the remote device;
      transmit, to the computing device using the wireless communication circuitry, the activation token to be relayed to the remote device by the computing device, the activation token configured to activate at least a first feature of the one or more features of the software application on the remote device; and
      after transmitting the activation token, store, in the memory, an indication that the remote device has initiated use of at least the first feature of the software application, the indication comprising a start time for the session of use of the software application,
   wherein the session code is a random number generated by the remote device,
   wherein the processor is further configured to:
      determine whether the session code was included in a previously transmitted activation token; and
      determine whether the remote device is permitted to use the one or more features of the software application based on determining whether the session code was included in a previously transmitted activation token.

7. The system of claim 6, wherein the remote device does not include a real time clock.

8. A device configured to use a software application, wherein use of the software application by the device is tracked by a system without network connectivity to the device, the device comprising:
   memory configured to store instructions to execute one or more features of the software application; and
   a processor configured to:
      generate a session code;
      transmit, to a computing device separate from the device, a request to activate the one or more features of the software application, the request including the session code;
      receive, from a computing device separate from the device an activation token generated by the system to initiate a session of use of the software application on the device, wherein the activation token includes the session code generated by the device and the activation token is configured to activate at least a first feature of the one or more features of the software application; and
      enable, using the activation token, at least the first feature of the software application on the device;
   wherein the processor is further configured to receive the activation token after transmitting the request to activate the one or more features of the software application including the session code;

wherein enabling, using the activation token, at least the first feature of the software application comprises:

determining that the session code is different from one or more previous session codes corresponding to one or more previous sessions of use of the software application.

9. The device of claim 8, wherein the device does not include a real time clock.

10. The device of claim 8, wherein the processor is further configured to:

disable the first feature of the software application; and transmit, to the computing device, a deactivation token indicating to the system that the first feature of the software application has been disabled by the device.

11. The device of claim 8, wherein the one or more features of the software application comprise a plurality of features including the first feature and a second feature, and the processor is further configured to:

transmit, to the computing device, a request to activate the plurality of features; and enable, using the activation token, the first feature without enabling the second feature.

12. The device of claim 8, wherein the processor is further configured to:

disable the first feature of the software application;

receive a subsequent activation token, wherein the subsequent activation token is configured to activate at least the first feature of the software application and includes a second session code;

determine that the second session code in the subsequent activation token matches the session code; and prevent enabling of the first feature using the subsequent activation token after determining that the second session code of the subsequent activation token matches the session code.

* * * * *